United States Patent
Takayama et al.

(10) Patent No.: US 6,413,328 B2
(45) Date of Patent: *Jul. 2, 2002

(54) HIGH SURFACE PRESSURE RESISTANT STEEL PARTS AND METHODS OF PRODUCING SAME

(75) Inventors: Takemori Takayama; Naoji Hamasaka, both of Hirakata (JP)

(73) Assignee: Komatsu LTD, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/319,999

(22) PCT Filed: Dec. 3, 1997

(86) PCT No.: PCT/JP97/04430

§ 371 (c)(1),
(2), (4) Date: Jun. 16, 1999

(87) PCT Pub. No.: WO98/27242

PCT Pub. Date: Jun. 25, 1998

(30) Foreign Application Priority Data

Dec. 17, 1996 (JP) ............................... 8-354150

(51) Int. Cl.$^7$ ............................... C23C 8/32; C23C 8/56
(52) U.S. Cl. ............................................ 148/319
(58) Field of Search ......................... 148/230, 218, 148/219, 319

(56) References Cited

U.S. PATENT DOCUMENTS

| | | | |
|---|---|---|---|
| 4,386,972 A | * 6/1983 | Knight ........................ | 148/16 |
| 4,971,634 A | * 11/1990 | Shibata et al. ............. | 148/16.5 |
| 5,372,655 A | * 12/1994 | Presser et al. .............. | 148/230 |
| 5,415,705 A | * 5/1995 | Furumura et al. ......... | 148/319 |
| 5,427,457 A | * 6/1995 | Furumura et al. ......... | 384/450 |
| 5,427,600 A | * 6/1995 | Itoh et al. ..................... | 75/232 |
| 5,456,766 A | * 10/1995 | Beswick et al. ............. | 148/216 |
| 5,595,610 A | * 1/1997 | Maeda et al. ............... | 148/233 |
| 5,658,082 A | * 8/1997 | Tsushima et al. ........... | 384/492 |
| 5,944,916 A | * 8/1999 | Chung ......................... | 148/229 |
| 6,258,179 B1 | * 7/2001 | Takayama et al. .......... | 148/233 |
| 2001/0001396 A1 | * 5/2001 | Takayama et al. .......... | 148/230 |

FOREIGN PATENT DOCUMENTS

| | | |
|---|---|---|
| JP | 2-277764 | 11/1990 |
| JP | 4-88148 | 3/1992 |
| JP | 4-160135 | 6/1992 |
| JP | 5-70925 | 3/1993 |
| JP | 5-320822 | 12/1993 |
| JP | 6-17224 | 1/1994 |
| JP | 7-3393 | 1/1995 |
| JP | 8-3720 | 1/1996 |
| JP | 8-81734 | 3/1996 |
| JP | 8-120438 | 5/1996 |

* cited by examiner

*Primary Examiner*—Roy King
*Assistant Examiner*—Harry D. Wilkins, III
(74) *Attorney, Agent, or Firm*—Armstrong, Westerman & Hattori, LLP

(57) ABSTRACT

High surface pressure resistant steel parts and their producing methods are disclosed. These steel parts are useful as gears, cams, bearings and similar high-strength compact steel articles which are required to have wear resistance and strength to withstand fatigue in rolling or rolling-slipping applications. In a steel part formed according to the invention, a fine nitride and/or carbonitride having at least an average grain size of 0.3 μm or less is dispersed in the contact surface structure; a multi phase structure composed of martensite, which is divided into extremely fine pieces, forming a disordered shape, by the nitride and/or carbonitride, is formed; and a carbide having a grain size of 3 μm or less is dispersed to increase the hardness of the surface. Such a steel part is produced by carrying out carbonitriding or carburization/carbonitriding so as to precipitate extremely fine AlN, using nitrogen permeating from the surface and by carrying out quenching or quenching/tempering, starting from a temperature region where the parent phase is austenite

9 Claims, 13 Drawing Sheets

HIGH SURFACE PRESSURE RESISTANT STEEL PARTS AND METHODS OF PRODUCING SAME

TECHNICAL FIELD

The present invention relates to high surface pressure resistant steel parts and producing methods thereof. The high surface pressure resistant steel parts are suitably used as power transmitting parts which are required to have contact fatigue strength and wear resistance and examples of which are rolling members (e.g., gears and bearings), the races of a rolling member and cam components.

BACKGROUND ART

In recent years, mechanical reduction gears and transmissions are increasingly required to have high power transmitting capability to meet the trend toward high output power, light weight and compactness. More compactness and higher surface pressure strength are required particularly in gears and bearings.

High contact fatigue strength is also required in gears and bearings used as power transmitting elements in automotive and construction machinery applications. As a measure for enhancing surface pressure strength, a treatment such as carburization or nitriding is widely applied to gears for the purpose of surface hardening. Another measure such as addition of Mo to steel is also taken to increase surface pressure strength, whereby the hardness of the surface as well as resistance to softening caused by tempering is increased. A method widely used in recent years is such that a carburization or carburization/carbonitriding treatment is applied to steel, and then, quenching and shot peening are carried out in order to significantly increase surface hardness, while providing considerable compressive residual stress to the steel.

There has been reported a method in which a high density cementite phase is precipitated on the surface of steel through carburization thereby increasing surface hardness, tempering softening resistance, and therefore surface pressure strength.

There has also been reported a development of highly clean steel which is designed to reduce the amount of inclusions with a view to the prevention of destruction due to contact fatigue, which occurs with inclusions as a starting point.

As noted earlier, a method, in which increased surface pressure strength is achieved by carburization of steel to which Mo (tempering-softening resistant element) has been added in a larger amount than the conventional steels, is known as an attempt to increase surface hardness and to restrict a decrease in hardness due to exothermic reaction caused by minute shear deformation resulting from friction and contact stress (Hertzian stress) which occur during rolling movement or rolling movement accompanied with sliding. In practice, this method, however, presents the following drawbacks: In spite of enhancing tempering-softening resistance, the thickness of an oil film formed on the contact surface decreases with increases in contact stress, resulting in a significant increase in wear because of the degradation of lubricating properties. This further promotes exothermic reaction and contact stress, which is a cause of creation of destructive shearing stress. Therefore, the desired, satisfactory improvement in surface pressure strength cannot be expected. Furthermore, the addition of large amounts of a tempering-softening resistance enhancing element such as Mo entails a considerable increase in the production costs of steel materials.

A known method, in which intensive shot peening is applied to the surface of a carburized article to allow the martensitic transformation of residual austenite which exists in the region extending from the outermost surface to a depth of about 200 $\mu$m below the surface so that higher surface hardness and greater compressive residual stress are achieved, thereby improving surface pressure strength, does not necessarily have versatility for the following reasons. Microscopic defects are created by shots to a grain boundary oxidation layer (defective layer) which has been created during carburization. When the steel article is in the initial stage of rolling operation, these defects bring about wear chip powder generation and surface roughness, resulting in an increase in wear factors. Another reason is that, in the case of gears, a chip in a tooth attributable to the buildup of strong residual stress as well as the presence of compressive residual stress adversely affects spalling resistance and, therefore, surface roughness causes an increase in wear factors, which results in a decrease in surface pressure strength on the contrary.

There is a case where a gear is subjected to high-carbon carburization or high concentration carburization in which a high density of cementite phase is precipitated on the surface layer of the gear by carburizing in a different manner. There is also a case where the hardness of a bearing surface is increased basically by the effect of cementite precipitation similarly to the case of bearing steel such as SUJ2 in which cementite is granulated and finely dispersed, while tempering-softening resistance is improved by the effect of particle dispersion. However, where a high density of cementite is precipitated by the above high carbon carburization process, the precipitated cementite is large in size, namely 5 to 10 $\mu$m, so that the agglomeration of cementite is likely to occur and an extremely large scale of precipitation appears along grain boundaries. As a result, the agglomerated cementite is destroyed by a shearing force generated from contact stress, forming starting points from which surface defects will occur. If this method is applied to manufacture of gears, the strength of the dedendum will be decreased.

Attempts have been made to fine cementite and prevent the cementite agglomeration by an improved high carbon carburization process or by a choice of adequate alloy elements for use in steel. For instance, Japanese Patent Publication (KOKAI) Gazette No. 4-160135 (1992) discloses a method according to which the concentration of Cr is increased to 2 to 8 wt %, one or more elements selected from the group consisting of 0.5 to 4 wt % Ni, 0.01 to 0.5 wt % Nb, 0.1 to 2 wt % V, and 0.05 to 1 wt % Mo are added, and the surface carbon content after carburization is increased to 2.0 wt % or more, whereby the carbides and carbonitrides of V and Cr of 5 $\mu$m or less are precipitated in the region extending from the surface to a depth of 150 $\mu$m below the surface. This method is, however, costly, because of the addition of large amounts of Cr for the purpose of facilitating cementite precipitation during a carburizing phase and the addition of V for the purpose of restraining the agglomeration/grow of precipitated cementite. Additionally, the concentration of Cr, V, Mo, Mn and the like in the precipitated cementite causes a decrease in the concentration of these alloy elements in the parent phase of austenite, which leads to formation of an imperfect quenched layer due to a lack of quenching ability after carburization. In order to prevent the formation of an imperfect quenched layer, Ni, which hardly concentrates in a carbide, is added and, in consequence, the material becomes more expensive.

Japanese Patent Publication (KOKAI) Gazette No. 8-120438 (1996) discloses a method and material for restraining formation of an imperfect quenched layer in a quenching process while employing less expensive alloy designs. In this publication, surface carbon content is established at 1.5 wt % or less in order to prevent the growth and agglomeration of precipitated carbides having grain size exceeding 5 μm. Since the optimum carbon content is 1.5 wt % or less, the amount of precipitated carbides is rather small, that is, approximately 7% by volume or less. In addition, permeating nitrogen is not effectively utilized in precipitating carbides or carbonitrides but is mostly dissolved in the parent phase of austenite to be utilized only for preventing formation of an imperfect quenched layer during quenching.

The method disclosed in the publication 8-120438, however, reveals the following disadvantages. The method of the publication does not precipitate a large amount of a carbide (cementite) like the conventional high carbon carburization process. Therefore, this method cannot be expected to have improved surface pressure strength which is attributable to improvements in hardness and in tempering-softening resistance owing to a large amount of cementite precipitation. In other words, the formation of an imperfect quenched layer, which is due to the concentration of a large amount of quench promoting elements such as Cr and Mo in cementite and a lack of these elements concentrated in the parent phase of austenite, is prevented at the cost of a small amount of cementite precipitation. With this arrangement, the method intends to make a balance between surface pressure strength and rotary bending fatigue strength, but in reality, it fails to ensure satisfactory surface pressure strength. A method similar to the method of the above publication is disclosed in Japanese Patent Publication (KOKAI) Gazette No. 8-3720. According to No. 8-3720, a large amount of cementite is precipitated, while Ni which is likely to exclude cementite and promotes quenching and Mo which does not concentrate to a large extent in cementite and effectively promotes quenching are added in large amounts in order to ensure quenching properties.

In manufacture of shaft supporting products such as bearings, highly clean bearing steel is used in many cases in order to ensure long rolling life. To produce such clean steel, a steel material undergoes sufficient degassing at the steel refining stage and undergoes many stages of desulfurization and dephosphorization with special slug, thereby reducing inclusions such as oxides, nitrides and sulfides. It has been reported that rolling life can be increased by approximately 10 times by use of a highly clean bearing steel in which the quantity of inclusions such as oxides and sulfides of 10 to 20 μm is reduced. Low-carbon steel for machine structural use, which is generally used in production of ordinary gears, does not ensure sufficient cleanness. Moreover, even if highly clean steel for machine structural use could be produced, its production cost would be extremely high. Therefore, there remains a need for the development of an economical technique which is capable of improving surface pressure strength, even if a steel material having the same inclusion level as that of currently manufactured steel for machine structural use is used.

Even if the quantity of inclusions contained in a steel can be reduced, the steel is liable to damage and fatigue starting from its contact surface, because of dust included in a lubricating oil, wear powder, and the like. For producing high surface pressure resistant parts, it is necessary to incorporate a surface reinforcement technique to withstand such contamination.

The present invention has been directed to overcoming the foregoing problems and the primary object of the invention is therefore to provide high surface pressure resistant steel parts and their producing methods, the steel parts meeting the trend toward high strength and compactness and being suited for use as gears, cams and bearings which are required to have wear resistance and strength for withstanding the working conditions of rolling movement and rolling movement accompanied with slipping.

DISCLOSURE OF THE INVENTION

The above object can be accomplished by a high surface pressure resistant steel part according to the invention. This steel part contains a nitride which is dispersed in a surface structure and has an average grain size of 3 μm or less, and has a multi phase structure composed of martensite as a parent phase which is finely divided into pieces by the dispersed substance.

According to the invention, there is provided a method of producing a high surface pressure resistant steel part, the method comprising the steps of:

precipitating a nitride while allowing carbon and nitrogen to diffusely permeate from a surface by carbonitriding and/or carburization/(carbonitriding; and forming a martensite phase subsequently to or independently of the nitride precipitating step, by rapidly cooling from the austenite temperature region of steel.

One of the features of the invention resides in that a fine nitride and/or fine carbonitride having at least an average grain size of 0.3 μm or less is essentially dispersed in a contact surface structure, so that a multi phase structure is formed which comprises disordered martensite as a parent phase, the martensite being divided into much finer pieces by the nitride and/or carbonitride, compared to the conventional lenticular martensite. In addition, the invention uses a steel in which a carbide (cementite) of 3 μm or less is dispersed thereby reinforcing its surface, 20 to 80% by volume residual austenite is added as a structural component thereby improving toughness, and at least 0.3 to 3.0 wt % Al is contained thereby improving resistance to dust contained in a lubricant and to inclusions contained in the steel.

The invention is also associated with a method of producing a high surface pressure resistant part through the steps of: applying carburization, carbonitriding or carburization/carbonitriding to a steel material to cause precipitation of extremely fine AlN in an amount of 0.5 to 4.5 wt % (when this amount is represented on the basis of percentage by volume, the figure is about 2.4 times the figure represented by percentage by weight) by use of nitrogen which is permeated from the surface; precipitating cementite having an average grain size of 3 μm or less in an amount up to 30% by volume; and starting quenching or quenching/tempering from the range of temperature at which the parent phase is austenite. It should be noted that the penetration depth of nitrogen should be arbitrarily adjusted according to the distance from the surface to the position where the maximum shearing stress occurs. The maximum shearing stress is generated by the maximum contact pressure (i.e., Hertz's contact pressure) exerted on the rolling contact surface of an article to be produced. Generally, the penetration depth of nitrogen is 1 mm or less and more preferably 0.5 mm or less in view of economical carburization/carbonitriding and economical carbonitriding.

As noted earlier, most of the conventional techniques aim at high hardness and improved tempering-softening resistance. In terms of structure, they are intended for prevention of an occurrence of surface cracking caused by contact stress. Therefore, there still remains the common problem that surface cracking once occurred cannot be prevented from spreading.

The invention is not only intended to improve the prior art in terms of prevention of an occurrence of surface cracking but also gives consideration, from the viewpoint of histology, to a vital action for retarding a spread of cracking after it has occurred at the surface. After observation of the spreading route of cracking, it has been found that cracking spreading along lenticular martensite or lath martensite is an important factor for the development of a reinforcement mechanism, apart from cracking spreading along the defects of a material (the defects include: inclusions and carbide-aggregations contained in a material; a grain boundary oxidation layer formed at the stage of carburization or carburization/carbonitriding; large cementite particles and their aggregations; an imperfect quenched layer formed at the stage of quenching; previous austenite grain boundaries caused by segregation or quenching cracks). A lenticular martensite particle in an ordinary carburized and quenched structure is comparatively large, that is, about a few $\mu$m to tens of $\mu$m, and residual austenite particles of low hardness are present around a martensite particle, causing a situation in which a stress is likely to concentrate. Therefore, fining of the martensite is considered to be important. However, even if austenite crystal grains are fined with the intention of fining martensite (which is a measure usually taken), the size of the martensite after fining is limited to about a few $\mu$m, and thus, this measure has been found to be unsatisfactory as an improved reinforcement measure. According to the invention, 1 to 15% by volume of a nitride and/or carbonitride, which takes the form of spheres, rods or needles and has an average grain size of 0.3 $\mu$m or less, is so dispersed in high concentration as to penetrate into the martensite particles whereby the width of a martensite particle can be considerably reduced to about 1 $\mu$m or less. By virtue of the presence of a nitride and/or carbonitride serving as an obstacle, the martensite particles are bent or curved, structurally changing from a simple lenticular configuration to a fine disordered configuration. The invention thus exerts resistance to a spread of cracking. The above arrangement also has an effect on fine dispersion of the residual austenite distributed around the martensite particles. Further, when a part of the residual austenite undergoes martensite transformation owing to contact stress, it is formed into extremely fine, disordered martensite. It is conceivable that such transformation has the effect of causing a substantial decrease in stress concentration which occurs when large lenticular martensite particles collide with one another. Such transformation also mitigates the concentration of tensile residual stress in the residual austenite existing around the lenticular martensite, which, conceivably, has the effect of preventing a spread of cracking along the martensite.

As the dispersed substance, a precipitated substance much finer than the previously disclosed cementite is necessary (it should be noted, as shown in the photograph shown in FIG. 7 (described later), fining of martensite is hardly achieved by cementite precipitation). Therefore, the invention is arranged to chiefly precipitate a fine Al nitride through carbonitriding. The Al nitride has the following characteristics. It has markedly little solid solubility with respect to the parent phase of austenite. The Al nitride is negatively larger than cementite in free energy for forming a dispersed substance from the parent phase (this means that the Al nitride can be more stably precipitated than cementite). Additionally, it does not react with carbon originally contained in the steel, forming a carbide. It has precipitating speed much slower than the growing speed of cementite which starts to grow at the same time that Al nitride precipitation starts. The precipitation of the Al nitride is not a factor of substantially impairing the quenching characteristics of steel.

The contact surface of a part subjected to rolling movement accompanied with sliding is damaged, not only by cracks on the surface and in its vicinity, but also by wear and seizure at the outermost surface. It is possible to combine the known technique of the prior art with the above-described arrangement of the invention for improving surface strength and wear resistance. For instance, cementite of a few $\mu$m may be dispersed in high concentration by carburization to ensure high surface hardness.

The above-described carburization/carbonitriding treatment is performed in cases where the carbon concentration of a steel at an early stage is low like case hardening steel. On the other hand, in the case of high-carbon steel having carbon content as high as bearing steel, satisfactory improvement in surface pressure strength can be assured by precipitating a nitride only by carbonitriding at 800 to 850° C. in an atmosphere in which decarburization does not occur. It will be understood that although a bearing steel such as SUJ2 has a structure in which granulated cementite having an average grain size of 0.3 to 1.0 $\mu$m is dispersed in an amount of about 1 to 2.5% by volume, the configuration of the martensite in the quenched structure is lenticular and therefore the improvement such as achieved by the martensite configuration of the invention cannot be obtained with the above amount and size of granulated cementite.

In view of the fact that the structural transformation described in the previously disclosed technique (Japanese Patent Publication (KOKAI) No. 8-120438) is substantially equivalent to that of a bearing steel such as SUJ2 in terms of the size and amount of precipitated cementite, it is conceivable that the martensite parent phase of this publication is lenticular martensite. The steel disclosed in the publication No. 8-120438 differs from bearing steel in the addition of V, but V does not have a strong influence on the configuration of martensite parent phase for the following reason. V can be dissolved in an amount up to about 0.28 wt % at a carburized surface at a temperature of 930° C. (carburizing temperature). VC does not precipitate in a substantial amount but most of V is dissolved in cementite. In a case where V is added in an amount of 1 wt % which is the maximum amount disclosed in the publication, about 0.5 wt % V is already precipitated as a VC special carbide in the steel material, 0.28 wt % V is dissolved in austenite, and the remaining amount (i.e., 0.22 wt %) of V is expected to precipitate as a fine carbide during the carburizing process. The precipitating amount of a VC carbide is about 0.25% by volume which is very small compared to the precipitating amount of cementite disclosed in the embodiment of the invention.

As a measure of lessening the stress concentration occurring when the inclusions of the steel or dust included in a lubricant is entangled, the known technique of adjusting the amount of residual austenite is combined with the above-described technique of the invention. In view of the fact that the roller pitting life of the steel drops, when shot peening is applied to the steel of the invention as described later, after carburization/carbonitriding and quenching so that the amount of residual austenite in the surface layer is reduced to 10 to 15% by volume, the amount of residual austenite is established at 20% by volume or more and the upper limit of residual austenite is generally established at 80% by volume. If the amount of residual austenite is 80% by volume or more, wear resistance will decrease. It should be noted that the preferable amount of residual austenite is 20 to 60% by volume.

The quantitative control for residual austenite is carried out by controlling carbon potential and nitrogen potential at the time of carburization/carbonitriding or carbonitriding. In addition to the quantitative control, a mechanical pressurizing treatment such as shots or rolling or a thermal treatment such as subzero treatment is applied to the surface to transform the residual austenite phase to martensite, and a final adjustment is made from the viewpoint of the optimization of the surface hardness of steel.

To attain a fine nitride and/or carbonitride within the above multi phase structure, the amount of Al is established at 0.3 to 3.0 wt % and the amount of nitrogen contained in the surface is generally established at 0.4 to 2.5 wt %. When taking into account the relationship with the amount of Al (described later), the preferable amount of nitrogen is 0.7 to 1.7 wt %.

It has been confirmed that with Al in amounts of 0.2 wt % or more, the above-described fining effect on martensite as well as an improvement in surface pressure strength can be achieved. The upper limit of the amount of Al is not strictly limited, but is generally 3 wt % or more and preferably 0.5 to 2 wt % in view of the fact that addition of Al in amounts of 4 wt % or more causes precipitation of a ferrite phase in the internal structure of the steel of the high surface pressure resistant part and impairs the processability of the material.

Although the nitride dispersing effect observed in addition of Al may be expected by addition of V, the substantial amount of V effective in nitride dispersion is 0.2 wt % or less, which cannot achieve the same effect as obtained by addition of Al. The steel of the invention may be arranged to contain a carbide (cementite) precipitated on its surface in an amount up to about 30% by volume in order to further improve wear resistance and tempering-softening resistance, and arranged to contain 0.5 to 5.0 wt % Cr and/or 0.2 to 10 wt % V for the purpose of adjusting the average grain size of the precipitated cementite to 3 $\mu$m or less thereby preventing the decrease of fatigue strength due to the dispersion of the carbide. It is more preferable to employ these arrangements in combination with addition of Al.

In cases where the main purpose of addition of V is not precipitation of a nitride but fining of the cementite present on the surface, the upper limit of V is a few wt % on assumption that high temperature carburization at 1,100° C. (this is normal temperature) is carried out. Taking the cost into account, the upper limit of V is established at 2 wt % in the invention.

It is known that an Al nitride and/or Al carbonitride is most finely precipitated on the outermost surface and its grain size increases substantially in proportion to the depth of a region from the surface. In practice, when permeating nitrogen at a temperature of 900° C. or less, the average grain size is 0.3 $\mu$m or less in the region extending from the surface to a depth of 0.5 mm below the surface. Generally, shearing stress generated by contact stress is maximum in the region extending from the contact surface to a depth of 0.5 mm below the surface in many cases and therefore there is no problem. For finely dispersing the precipitated Al nitride and/or Al carbonitride, it is important to set a low temperature for the stage of nitrogen permeation. To ensure the quenching characteristics of the steel, the temperature at which nitrogen is permeated is preferably 800 to 850° C.

It will be understood from the above description that tempering-softening resistance can be remarkably improved by martensite in which an extremely fine Al nitride and/or Al carbonitride is densely dispersed and the improvement of tempering-softening resistance leads to an improvement in surface pressure strength.

The martensite is divided by the fine Al nitride and/or Al carbonitride so as to have a grain length of about 1 $\mu$m in the vicinity of the outermost surface. The martensite is so fined that its tissue is opt-microscopically indistinct. Such martensite is thought to have a significant effect of preventing cracking due to fatigue in the surface region.

The carbon concentration of the steel at its surface during carburization/carbonitriding and/or carbonitriding is established at at least 0.6 wt % or more in order to attain surface hardness, while the nitrogen concentration is established at 0.4 wt % or more in order to adjust the amount of residual austenite to 20% by volume or more. The upper limit of nitrogen content is allowed to vary according to the maximum value of Al concentration and established at 2.5 wt % or less in order to adjust the amount of residual austenite to its maximum value, that is, 80% by volume. The preferable amount of nitrogen is 0.7 to 1.7 wt % when taking the above-noted range of Al content into account. Cementite precipitation increases as carbon content increases after carbon content exceeds 1.1 wt %. The average grain size of cementite should not exceed 3 $\mu$m in order to prevent the agglomeration of cementite thereby preventing the decrease of roller pitting strength and rotary bending fatigue strength, and the amount of cementite precipitation with which the cementite grain size does not exceed 3 $\mu$m is about 30% by volume. To adjust the amount of cementite precipitation to 30% by volume, the upper limit of carbon content is established at 3.0 wt %. It should be noted that if the carbon content is 3.0 wt % or more, it becomes difficult to prevent the agglomeration of cementite particles even by addition of Cr and V and as a result, the decrease of bending fatigue strength and pitting strength cannot be effectively prevented.

For fine cementite precipitation, it is necessary to add Cr in an amount of 0.5 wt % or more. An addition of V in an amount of 0.2 wt % or more in combination with a Cr addition is more effective, because of the influence of the alloy element on the grain size of cementite precipitating in the austenite parent phase. More specifically, an alloy element, which is more likely to concentrate in cementite at the precipitating temperature, makes the cementite finer (i.e., where the concentration of an alloy element in cementite/the concentration of an alloy element in the austenite parent phase=distribution coefficient KM, an alloy element is more likely to concentrate in cementite, making the average grain size of the cementite smaller with increases in the distribution coefficient KM of the alloy element). Of the alloy elements generally used in ordinary steel for machine structural use, Cr and V have a large distribution coefficient, and therefore they have the strong effect of fining cementite. (According to the survey made by the inventors at a temperature of 900° C., the distribution coefficient KCr of Cr is 6.4, the distribution coefficient KV of V is 12.3, the distribution coefficient KMn of Mn is 2.1, the distribution coefficient KMo of Mo is 3.5, and the distribution coefficient KNi of Ni is 0.22.) Al has little solid solubility with respect to cementite and therefore does not effectively work on fining of cementite. However, Al exerts a fining effect although it is little, since Al needs to be forcibly expelled from cementite during the grow of cementite particles. Therefore, in cases where a large amount of Al is added like the invention, it works effectively. Precipitation of cementite in an amount of 30% by volume allows Al to significantly concentrate in the austenite parent phase, promoting the reaction of Al and permeating nitrogen to precipitate an Al nitride and/or Al carbonitride. Accordingly, the synergistic effects of cementite precipitation and Al precipitation can be expected. The upper limit of the amount of Cr is 5 wt % or less in view of the balance between quenching characteristics and cost.

The steel for machine structural use employed in the invention contains Al as an essential element and further contains at least one element selected from V and Cr. To attain strength at the core of the high surface pressure resistant part, other elements should be added in the following ranges.

C is an essential element for imparting the desired strength to the core. Generally, steel material for gears needs to have a carbon concentration of about 0.1 to 0.5 wt %. Bearing steel, to which carburization treatment is not applied when it is a finished product, generally contains carbon in an amount up to 1.2 wt % and undergoes the spheroidizing treatment. If carbon content exceeds 1.2 wt %, the agglomeration of cementite is promoted by spheroidizing of cementite, so that the desired rolling life cannot be expected. For the above reasons, the carbon contents of the steel material used in the invention is preferably established at 0.1 to 1.2 wt %.

Generally, Si is inevitably used as an ordinary element in an amount of 0.2 wt %. Si is also used conventionally as an element for enhancing tempering-softening resistance, and in such a case, the amount of Si is 1 wt % or less. Si can be expected to provide a martensite fining effect in carbonitriding like Al, but Si promotes grain boundary oxidation and causes variations in carburizing characteristics. Therefore, the amount of Si is preferably limited to 1 wt % or less.

Mn, Ni and Mo play an important part respectively in the quenching characteristics obtained after carburization/carbonitriding and/or carbonitriding. It is preferred for the invention to use them in amounts within the ranges which are usually adapted in steel for machine structural use. (For instance, Mn=0.1 to 1.5 wt %; N=0 to 4 wt %; Mo=0 to 1.0 wt %; trace amounts of boron)

Nb, Ti and Zr are added in slight amounts for the purpose of fining the crystal grains of steel material. In the invention, it is preferred to use them within the range usually adapted. They are also expected to function as a nitride-forming element like Al, contributing to precipitation of a fine nitride. However, they are highly reactive to carbon, when contained in steel material so that they precipitate in most amounts prior to carburization/carbonitriding and/or carbonitriding. Therefore, they need to be added in large amounts in order to precipitate a nitride, reacting with permeating nitrogen, which costs very high. In the invention, taking the above facts into account, their use is limited to fining the crystal grains of steel and the amounts of them are therefore limited to the range of from 0 to 0.1 wt %.

Ca, S and Pb are usually added for the main purpose of improving machinability. To achieve improved machinability, the amounts of these elements are preferably adjusted according to their purposes of use in view of the object of the invention, that is, improved surface pressure strength.

As described above, the surface carbon content and surface nitrogen content of steel are controlled by carburization/carbonitriding and/or carbonitriding, thereby positively adjusting the amount of residual austenite remaining after quenching in a region close to the surface layer. It is also possible to adjust the amount of residual austenite by a physical or thermal means such as the above-noted shot peening or subzero treatment. The rolling life of steel having residual austenite, the amount of which has been reduced to 10% by volume or less by shot peening, tends to vary significantly (the amount of residual austenite was obtained by the X-ray analysis conducted from the surface layer). It was also observed that the surface pressure strength of steel tends to be stable by the presence of residual austenite in an amount of 20% by volume or more. If 80% by volume of residual austenite is present, wear in the rolling surface progresses at such a rate that the rolling surface is worn out earlier than the rolling life and the surface hardness of the steel considerably decreases. Therefore, the preferable amount of residual austenite is 20 to 60% by volume in the region extending from the outermost surface to a depth of 50 $\mu$m below the surface and 20 to 80% by volume in the region extending from the surface to a depth of 0.5 mm.

The carburization, carburization/carbonitriding and/or carbonitriding treatment of the invention is carried out in the following way. After carburization is once performed at 900° C. or more, temperature is decreased to about 850° C. Then, a carbonitriding atmosphere is established with ammonia gas being additionally introduced and carbonitriding is carried out without decarburization or by carburization. An alternative treatment is as follows. After carburization has been carried out at a high temperature ranging from 930° C. to 1,100° C. to obtain surface carbon content within the range of from 1.1 wt % to about 2 wt %, temperature is once dropped to $A_1$-point temperature or less and the structure is changed to bainite, martensite or pearite. Then, the steel is reheated to $A_1$-point temperature or more, and while fine granulate cementite being precipitated or dispersed at temperature of 900° C. or less, carbon and/or nitrogen is diffusely permeated in the carburization/carbonitriding atmosphere or in the carbonitriding atmosphere. With this process, the carbon content of the resultant steel is made to be up to 3.0 wt % and the nitrogen content is made to be up to 2.5 wt %, with which the amount of cementite does not exceed 30% by volume.

The carburization/carbonitriding and/or carbonitriding of the invention is not limited to a particular method. The ordinary gas cariburization/carbonitriding or gas carbonitriding treatment may be adapted. Alternatively, carburization/carbonitriding or carbonitriding carried out under a reduced gas atmosphere or plasma atmosphere may be employed. In any cases, processing time may be adjusted so as to meet the above-described carburization/carbonitriding or carbonitriding conditions.

In the invention, extremely fine nitrides are densely, dispersedly precipitated in the rolling surface layer of a gear or bearing in the carburization/carbonitriding and/or carbonitriding process by effectively adding nitride-forming elements such as Al and V. In the subsequent quenching process, disordered acicular martensite finely divided by the precipitated nitride or carbonitride is formed in the parent phase in order to restrict the occurrence and spread of cracking due to fatigue in the vicinity of the surface when the resultant article is in rolling operation. Accordingly, the surface pressure strength of the part for use in high surface pressure applications can be dramatically increased.

In addition, a nitride and/or carbonitride containing Al as a chief component is used as the dispersed substance for effectively dividing and fining the lenticular martensite. By the use of Al, the precipitate can be extremely fined. Al is not reactive to carbon originally contained in the steel and substantially all of its amount can be effectively used in forming the precipitate in the reaction during the carburization/carbonitriding and/or carbonitriding process. In addition to the dispersion effect of the Al nitride and/or Al carbonitride, surface pressure strength can be increasingly improved while preventing the decrease of fatigue strength, by adding Cr and V to steel material to dispersedly precipitate a large amount of fine cementite having a size of 3 $\mu$m or less at the surface of the material.

After the above-described carburization/carbonitriding and/or carbonitriding process, oil quenching or water quenching is carried out to harden the carburization-carbonitrided/carbonitrided part so that a hard layer, in which martensite is fined by an extremely fine, precipitated Al nitride and/or Al carbonitride, can be formed and the resultant part has superior pitting resistance. Quenching preferably starts from a temperature equal to or higher than the $A_1$ point transition temperature of steel. Alternatively, quenching is carried out by reheating to a temperature equal to or more than the $A_1$ point temperature after cooling to a temperature lower than the $A_1$ point temperature. In the case of the steel of the invention in which an Al nitride is precipitated, the crystal grains of the carbonitrided layer can be easily fined to have an average grain size of about 5 $\mu$m or less by reheating quenching, and this contributes to an improvement in rotary bending fatigue strength.

BEST MODE FOR CARRYING OUT THE INVENTION

Figure 1:
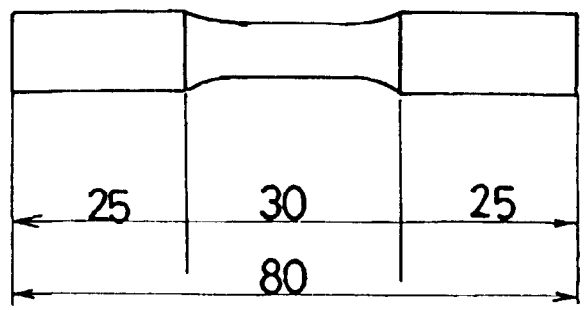
FIG. 1 is a side view of a specimen of a high surface pressure resistant steel part prepared according to one embodiment of the invention, the specimen being used for rotary bending tests.

Referring now to the drawings, there will be explained high surface pressure resistant steel parts and methods for producing thereof according to preferred embodiments of the invention.

TABLE 1 shows the compositions of steels prepared according to the invention and steels prepared for the purpose of comparison. The carbon contents of these specimens range from 0.2 wt % to 1.1 wt %. A carbon content of 0.2 wt % is often employed in the manufacture of case hardening steel for gears and the like, while a carbon content of 1.1 wt % is often employed in the manufacture of medium carbon steel and SUJ2 that is a representative example of bearing steel. Specimens No. 1 to 8 are prepared with the intention of checking the effects of additions of Al and V. With these specimens, the dispersion effect of an Al nitride and/or Al carbonitride was checked. Also, the combined effects of dispersion of fine cementite and dispersion of an Al nitride and/or Al carbonitride were checked. Specimens Nos. 9 to 12 are medium carbon steel, SNCM420H, 420H and SUJ2, respectively and prepared as comparative examples.

TABLE 1

| ALLOY COMPOSITIONS OF SAMPLES STEELS | | | | | | | |
|---|---|---|---|---|---|---|---|
| C | Si | Mn | Cr | Ni | Mo | V | Al |
| MATERIALS PREPARED ACCORDING TO THE INVENTION | | | | | | | |
| No. 1  0.55 | 0.24 | 0.75 | 0.47 | | | | 0.52 |
| No. 2  0.2 | 0.22 | 0.75 | 1.02 | | 0.15 | 0.42 | 0.031 |
| No. 3  0.21 | 0.07 | 1.04 | 2.85 | | | 0.2 | 0.03 |
| No. 4  0.22 | 0.08 | 1.01 | 2.81 | | | 0.2 | 1.01 |
| No. 5  0.23 | 0.21 | 0.53 | 1.01 | | 0.2 | | 0.31 |
| No. 6  0.21 | 0.22 | 0.51 | 1.01 | | 0.21 | | 1.02 |
| No. 7  0.35 | 0.09 | 1.25 | 1 | | 0.19 | | 2.53 |
| No. 8  1.04 | 0.27 | 0.48 | 1.51 | | | | 0.75 |
| MATERIALS PREPARED FOR COMPARISON | | | | | | | |
| No. 9  0.56 | 0.25 | 0.76 | 0.51 | | | | 0.031 |
| No. 10  0.21 | 0.28 | 0.52 | 0.62 | 1.89 | 0.22 | | 0.05Nb |
| No. 11  0.22 | 0.26 | 0.76 | 1.03 | | 0.19 | | 0.029 |
| No. 12  1.02 | 0.28 | 0.5 | 1.47 | | | | |

Figure 2:
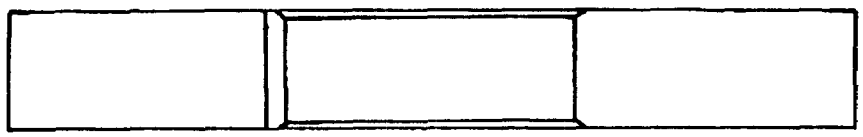
FIGS. 2(a) and 2(b) are side views of specimens of a small roller and a large roller respectively, these specimens being prepared according to the embodiment and used for roller pitting tests.
Figure 2:
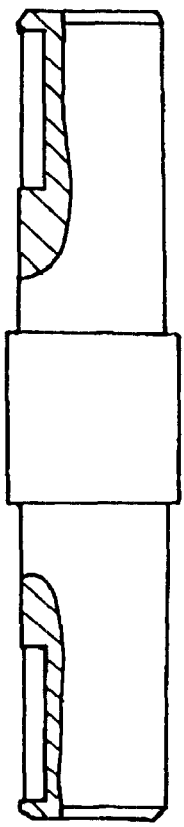

After casting, these sample steels were subjected to hot forging and normalizing and then formed into specimens for rotary bending tests and small roller specimens for roller pitting tests, as shown in FIGS. 1 and 2. For preparing large rollers for roller pitting tests, SUJ2 was quenched and tempered so as to have a hardness of $H_R$ C64. In the present embodiment, carburization/carbonitriding and carbonitriding treatments are carried out through the processes shown in FIGS. 3, 4 and 5. During the carburization/carbonitriding and carbonitriding treatment, carbon potential Cp is adjusted by controlling the $CO_2$ gas concentration of carburization gas and nitrogen potential Np is adjusted by controlling the flow rate of ammonia.

Figure 3:
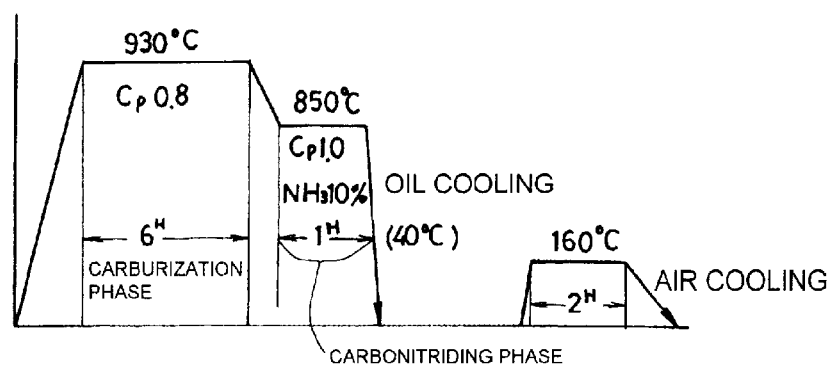
FIG. 3 is an explanatory view of a carburization/carbonitriding treatment according to the embodiment in which no cementite is precipitated in a carburization phase.

FIG. 3 shows a carburization/carbonitriding treatment in which carburization is carried out at 930° C. while adjusting Cp to 0.8 wt %, and then, carbonitriding is carried out at 850° C. This treatment is arranged so as not to precipitate cementite during the carburization phase and so as to precipitate Al nitrides during the carbonitriding phase. However, when using steels containing Cr in amounts of 1 wt % or more, there are some cases where a small amount of cementite precipitate. The reason for this is that when controlling Cp, the difficulty of controlling the percentage (0.25%) of $CO_2$ in RX gas (carburization gas) is avoided. But, such cementite precipitation has no problem in achieving the substantial effects of Al additions.

Figure 4:
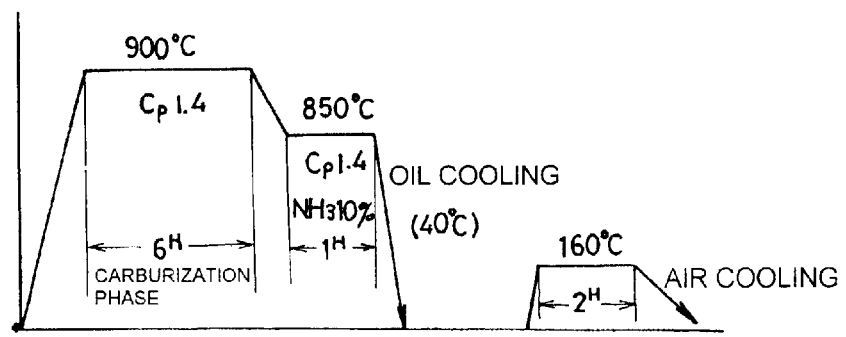
FIG. 4 is an explanatory view of a carburization/carbonitriding treatment according to the embodiment in which cementite is precipitated in a carburization phase.

FIG. 4 shows a process in which Cp is set to 1.4 wt % and precipitation of cementite is positively promoted during the carburization phase and at the same time, precipitation of an Al nitride is promoted by carbonitriding at 850° C.

Figure 5:
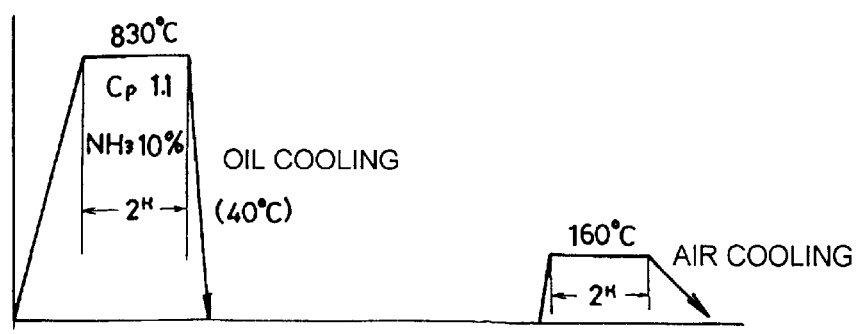
FIG. 5 is a process diagram of a carbonitriding treatment according to the embodiment.

FIG. 5 shows a process in which carbonitriding at a temperature of 830° C. is applied to Specimens Nos. 8 and 12 having carbon content as high as high carbon bearing steel. It should be noted that the tempering treatments applied to the specimens were all carried out at a temperature of 160° C. for two hours.

All the specimens underwent carbonitriding at 850° C. so as to have a nitrogen permeating depth of about 0.2 mm.

After the thermal treatment, the carbon and nitrogen concentrations of the surface layer of each specimen were obtained by analyzing the section of the specimen at appropriate time by EPMA (X-ray micro analyzer) which utilized analytical curves. An Al nitride and/or Al carbonitride which precipitated in the layer close to the surface and the martensite structure were observed, using an optical microscope and a scanning election microscope properly. The amounts of residual austenite and residual stress in each specimen at a position close to the surface layer were measured after applying electrolytic polishing to the surface.

A roller pitting fatigue test was conducted under the following conditions. Each small roller specimen shown in FIG. 2 was pressed against a large roller made of SUJ2 and the surface pressure strength of the small roller specimen was evaluated under the conditions, that is, a revolution speed of 1,050 rpm, a slip rate of 40%, and a surface pressure appropriately varied within the range of from 250 to 375 kg/mm$^2$. The pitting life of each small roller was evaluated on the basis of the number of revolutions until one pitting defect is created in the small roller. In the roller pitting tests, when no pitting was found within the revolutions of 20–30×10$^6$ times, no more revolution was carried out after that.

The bending fatigue strength of each small roller was evaluated with a revolution speed of 3,600 rpm and the limit of the number of revolutions was, 20×10$^6$ times.

Figure 6:
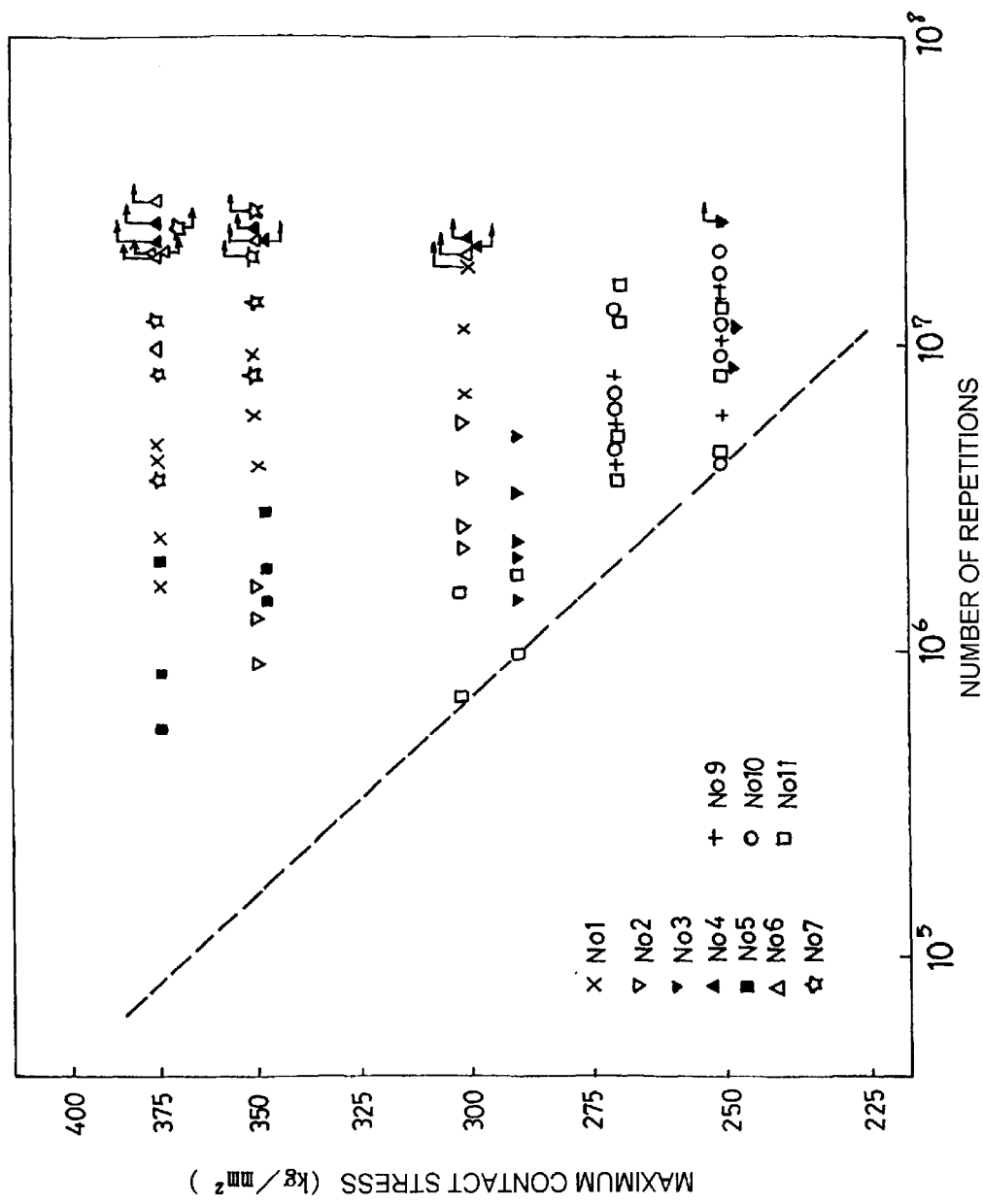
FIG. 6 shows the results of tests for checking the pitting life of small rollers after undergoing the carburization/carbonitriding treatment according to the embodiment in which no cementite is precipitated in the carburization phase.

FIG. 6 shows the pitting life of each small roller specimen which was carburized and carbonitrided under the conditions shown in FIG. 3. The lower limit of the variation of pitting life is represented by dashed line in FIG. 6 on the basis of the pitting life of Specimen Nos. 9 to 11 which contain substantially no Al. It is apparent from Specimen Nos. 1, 4, 5, 6, 7 and 8 which contain Al in amounts of 0.3 wt % or more that pitting life increases as the amount of Al increases. Especially Specimens Nos. 4 and 6, which contain Al in amounts of about 1 wt %, exhibited such high surface pressure strength that no pitting was created in most of the samples even under Hertz's contact pressure of 375 kg/mm$^2$ which is the maximum surface pressure employed in this embodiment. The significant effect of an addition of Al can be admitted even in Specimen No. 5 which contains 0.31 wt % Al. Specimen No. 7 containing 2.53 wt % Al exhibits a shorter pitting life than Specimens Nos. 4 and 6 for the following reason. While Specimens Nos. 4 and 6 have a nitrogen carbonitriding depth of 0.2 mm, Specimen No. 7 processed under the conditions shown in FIG. 3 has less permeating depth which varies within the range of from 0.05 to 0.12 mm since the carburizing time for it was insufficient. The pitting life of Specimen No. 7 can be improved by extending the time of carburization at 850° C. In Specimen No. 2, which contains substantially no Al but contains 0.42 wt % V, the effect of addition of V can be slightly admitted, but this effect is not significant compared to the effect of Al addition. It is understood from the fact that Specimen No. 3 containing 2.85 wt % Cr was not improved in pitting life that the effect of addition of Cr is not important and Cr does not react with permeating nitrogen under the carburizing/carbonitriding conditions of the invention in which cementite is not actively precipitated.

Figure 7:
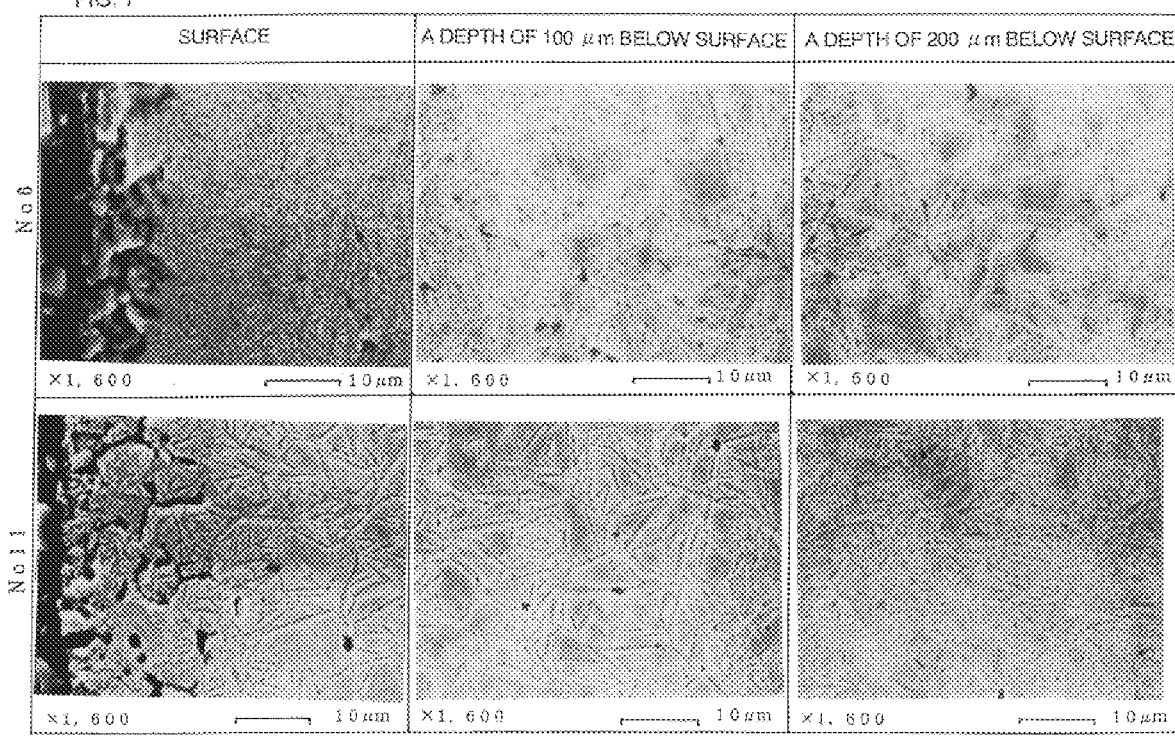
FIG. 7 is photographs which show, for comparison, the metallographic structures of Specimen No. 6 (prepared according to the embodiment) and Specimen No. 11, at regions in the vicinity of their respective surfaces.
Figure 8:
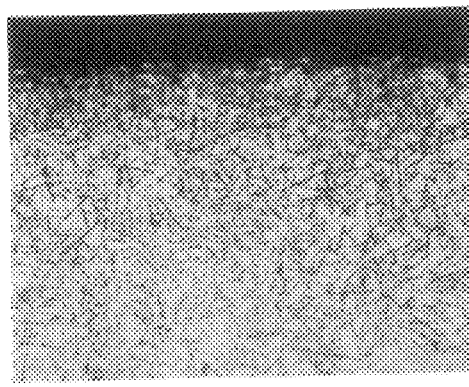
FIG. 8 is high magnification photographs showing the metallographic structures of Specimens Nos. 6 and 11 at the regions extending from their respective outermost surfaces to a depth of 100 $\mu$m.
Figure 8:
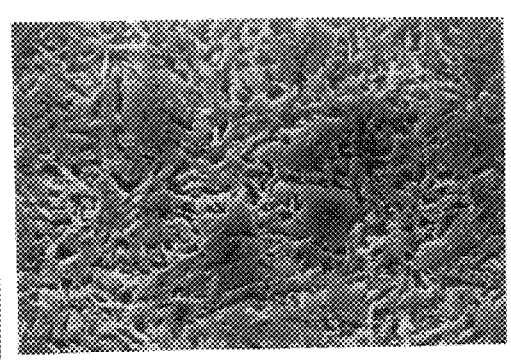
Figure 8:
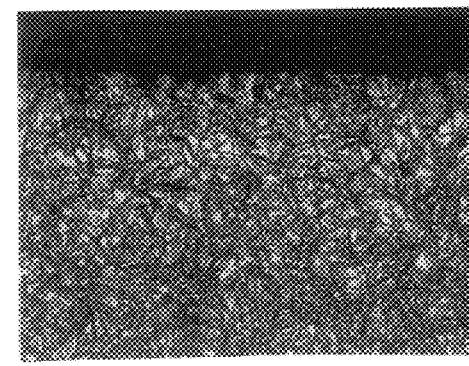
Figure 8:
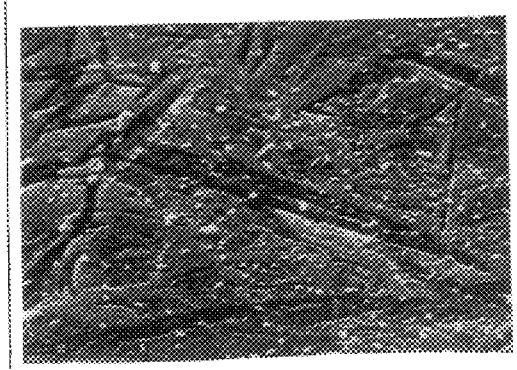

FIG. 7 shows, for comparison, the metallographic structures of Specimens Nos. 6 and 11 at regions near their respective surfaces. Specimen No. 6 is a representative steel containing Al whereas Specimen No. 11 is its comparative material. As seen from FIG. 7, extremely fine martensite is precipitated in the region near the outermost surface in Specimen No. 6, and the average length of the martensite particles is about 1 μm or less. The martensite of Specimen No. 6, which is observed as acicular martensite by an optical microscope, is composed of a linkage of such extremely fine martensite particles and accordingly, distinctly differs from its comparative material in the structural configuration of martensite. FIG. 8 shows high-magnification photographs showing the metallographic structures of Specimens Nos. 6 and 11 at the regions extending from the respective outermost surfaces to a depth of 100 μm below the surfaces. It is seen from FIG. 8 that the martensite of Specimen No. 6 includes uniformly dispersed an Al nitride having an average grain size of 0.3 μm or less and the martensite is finely divided into pieces having a width of about 1 μm or less by the fine Al nitride and/or Al carbonitride, forming a disordered martensite configuration. Although a small amount of cementite having a grain size of about 0.1 to 0.2 μm is precipitated in the comparative material of Specimen No. 11, the martensitic structure of this material is substantially lenticular martensite having significant linearity. Obviously, the dispersion of cementite having the above size level does not have the effect of fining martensite. It is observed in Specimen No. 6 that, apart from fine granular ones, a considerable amount of Al nitride and/or Al carbonitride particles having a shape of fiber (rod) is precipitated on the surface and the diameter of these nitrides and/or carbonitride particles is 0.3 μm or less. One of the features of the invention resides in such a short fiber-like precipitation form which has strengthening effects.

Figure 9:
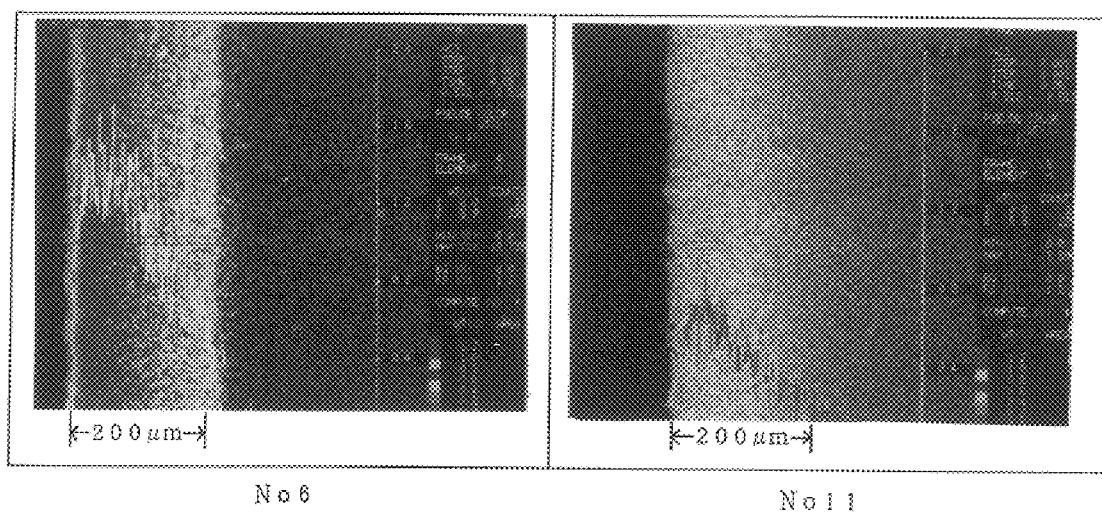
FIG. 9 is photographs of the metallographic structures of Specimens Nos. 6 and 11 at the surface, showing the result of a nitrogen analysis by use of EPMA.

FIG. 9 is photographs of the metallographic structures of the surfaces of Specimens Nos. 6 and 11, showing the result of a nitrogen analysis by use of EPMA. The nitrogen concentrations of Specimens Nos. 6 and 11 are 1.2 wt % and 0.7 wt %, respectively. Although the surface nitrogen concentrations of the specimens largely vary according to Al concentrations, the amount of nitrogen changed to AlN is substantially equal to the amount of nitrogen calculated from the stoichiometric composition of AlN, on assumption that Al which has been added is all changed to AlN. Specimen No. 6 contains the desired amount of carbon.

It has been confirmed by the X-ray analysis that the amounts of residual austenite at the respective surface layers of Specimens Nos. 6 and 11 substantially fall in the range of from 40 to 60% by volume. Regarding the amount of residual austenite in the region extending from the outermost surface to a depth of 20 μm, Specimen No. 6 containing Al surpasses Specimen No. 11 by an amount of about 12% by volume. As a whole, the amount of residual austenite in a structure quenched after the carburization/carbonitriding process is highly dependent on the amount of permeated nitrogen, and it is confirmed that all of the specimens prepared according to the embodiment contain nitrogen in amounts of 30% by volume or more.

Figure 10:
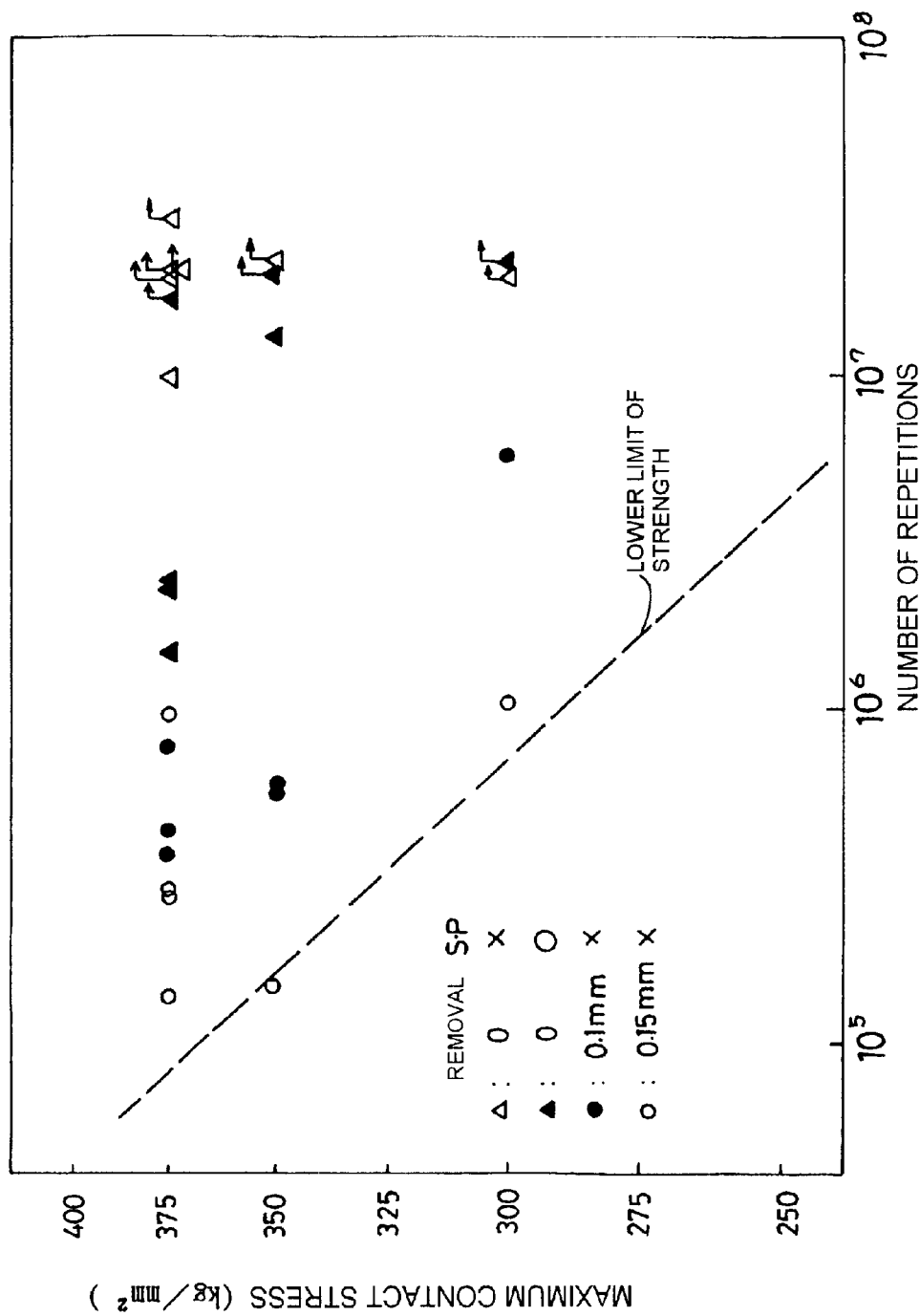
FIG. 10 shows the pitting life of rollers at their carbonitrided surfaces formed by quenching subsequent to the carburization/carbonitriding treatment of the embodiment.

To observe the influence of a carbonitrided surface portion created by quenching after the carburization/carbonitriding process on the roller pitting life of steel, the region extending from the surface to a depth of 0.10 mm and the region extending from the surface to a depth of 0.15 mm were respectively removed from the carbonitrided portion (0.2 mm) of Specimen No. 6 which had undergone the carburization/carbonitriding process, and pitting was checked. FIG. 10 shows the pitting result. Further, shot peening was applied to the surface layer of Specimen No. 6 with an arc height of 0.9, thereby reducing the amount of residual austenite at the surface to about 14%. The pitting result of this case is also shown in FIG. 10.

It has been found that as the amount of removal of the carbonitrided layer increased, pitting life markedly decreased, and finally, the pitting strength of Specimen No. 6 became substantially equal to that of the comparative material which had undergone the carburization/carbonitriding process in which the Al nitride having the effect of fining martensite was not precipitated. It has been also found that the reduction in the amount of residual austenite by shot peening decreases the pitting life of, particularly, a steel subjected to the maximum surface pressure (i.e., 375 kg/mm²) of the present embodiment, but the adverse effect of shot peening is not as significant as the adverse effect of the removal of the carbonitrided layer. It is well known that shot peening has the good effect of markedly hardening the surface of steel and creating high compressive residual stress and is also expected to increase pitting strength, wear resistance and bending fatigue strength. Hence, it is preferable to utilize shot peening to such an extent that the amount of residual austenite at the surface does not decrease to about 20% by volume or less.

Figure 11:
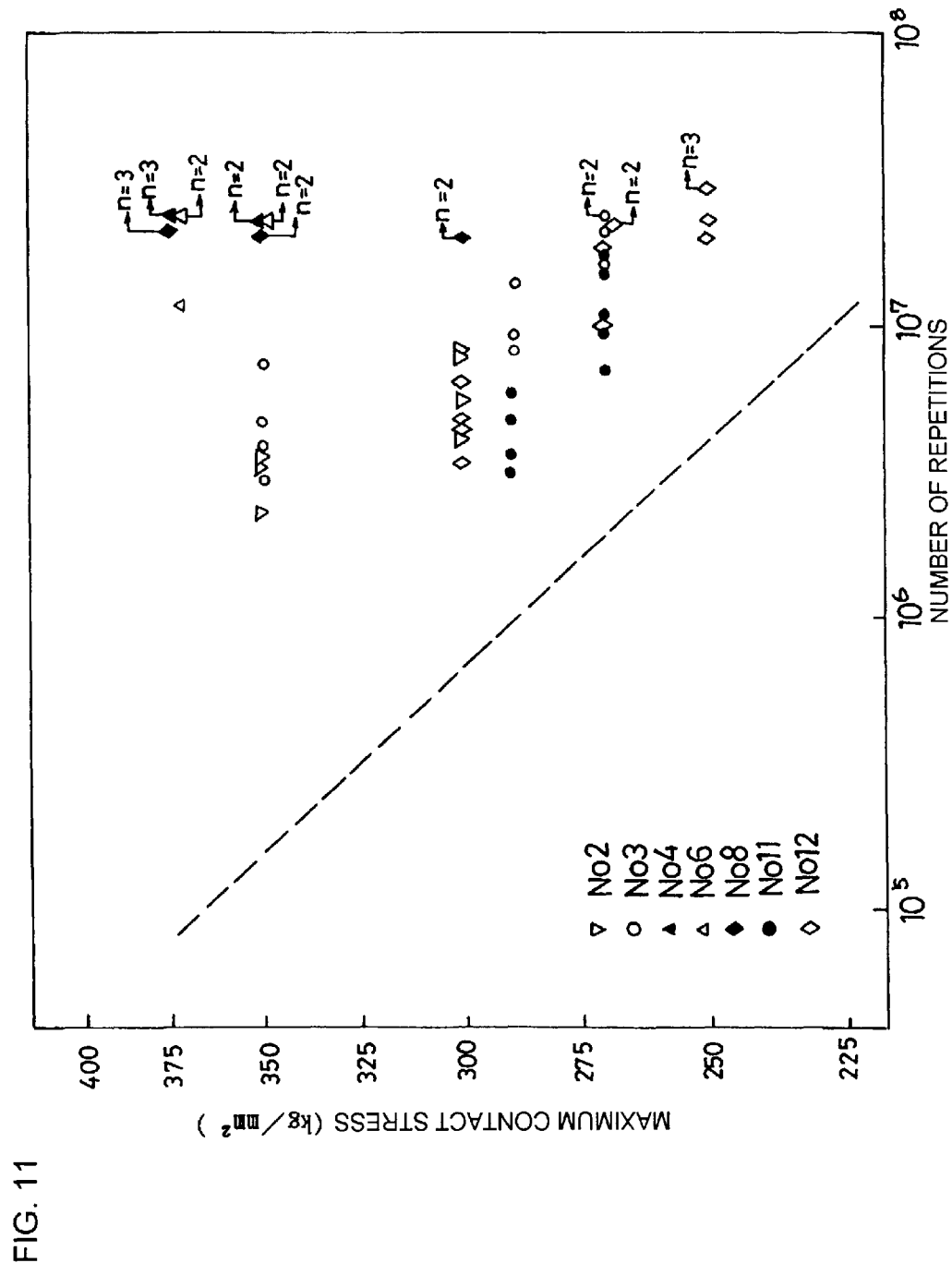
FIG. 11 shows the pitting life of small rollers after undergoing the carburization/carbonitriding treatment of the embodiment in which cementite is precipitated in the carburization phase.

FIG. 11 shows the pitting life of small roller specimens Nos. 2, 3, 4, 6 and 11 which underwent the carburization/carbonitriding process in which cementite was positively precipitated by permeating a high density of carbon under the conditions shown in FIG. 4. FIG. 11 also shows the pitting life of Specimens Nos. 8 and 12 of bearing steel materials having a high density of carbon and cementite which is originally precipitated therein. These specimens underwent the carbonitriding process shown in FIG. 5. The pitting life lower limit line indicated by dashed line in FIG. 6 is also shown as a reference for pitting life evaluation in FIG. 11.

It has been found that, generally, the pitting life of the comparative materials can be improved to a considerable extent by precipitation of cementite having a grain size of 5 μm or less, and a further improvement in pitting life can be achieved by addition of Al. The effects of cementite precipitation and Al nitride precipitation for fining martensite can be distinctly confirmed by, for instance, the comparisons between the life of Specimens Nos. 3 and 4 and between the life of Specimens Nos. 8 and 12 having the level of bearing steel. Hence, the combined effects of the above two kinds of precipitation carried out in the invention have been confirmed.

Specimens Nos. 2, 6 and 11 have surface carbon contents ranging from 1.5 to 1.8 wt % and a structure where cementite having an average grain size of 2 to 5 μm is precipitated. Specimens Nos. 3 and 4 have surface carbon contents ranging from 2.3 to 2.6 wt % and a structure where cementite having an average grain size of 1.5 to 2.5 μm is precipitated.

Cementite in Specimen No. 11 (SCM420H comparative material) has a grain size of 5 μm and cementite in Specimen No. 3 has a grain size of 2.5 μm. As the amount of Cr increases, the grain size of the precipitated cementite decreases, which is consistent with the previous report. Finer cementite was observed in steels to which Al was added. It will be understood from the relationship between carbon content and the grain size of cementite and from the structural effects of Al nitride precipitation that the above-described effects in improving pitting life are substantially rational.

Figure 12:
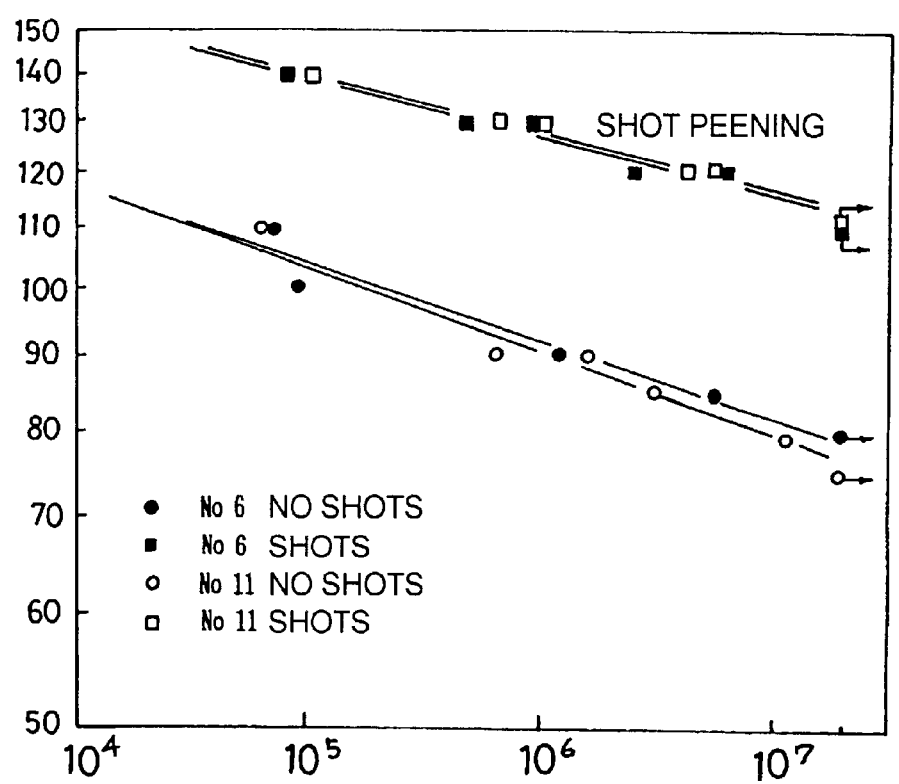
FIG. 12 shows the rotary bending fatigue strength of the specimens after undergoing the thermal treatment of the carburization/carbonitriding treatment of the embodiment in which no cementite is precipitated in the carburization phase.

FIG. 12 shows the rotary bending fatigue strengths of Specimens Nos. 6 and 11 after applying the thermal treatment shown in FIG. 3. Since an precipitated Al nitride layer caused by carbonitriding is present in the surface layer (0.2 mm) of Specimen No. 6, there may be concern about stress concentration due to the notching effect of bending stress present at the surface. However, it is understood from the results shown in FIG. 12 that there is no need to worry about such stress concentration. This is because the precipitated Al nitride is extremely fine, having a grain size of 0.3 μm or less. FIG. 12 also shows the rotary bending fatigue strengths of steels to which shot peening was applied with an arc height of 0.9 and the substantially same effect of Specimen No. 11 can be observed from it. As seen from this result, Al nitride precipitation does not create stress concentration points even when a reinforcement treatment is applied to the surface. The above effect can be also seen in the comparison of the rotary bending fatigue strengths of Specimens Nos. 8 and 11 (bearing steel) to which the thermal treatment shown in FIG. 5 was applied.

Figure 13:
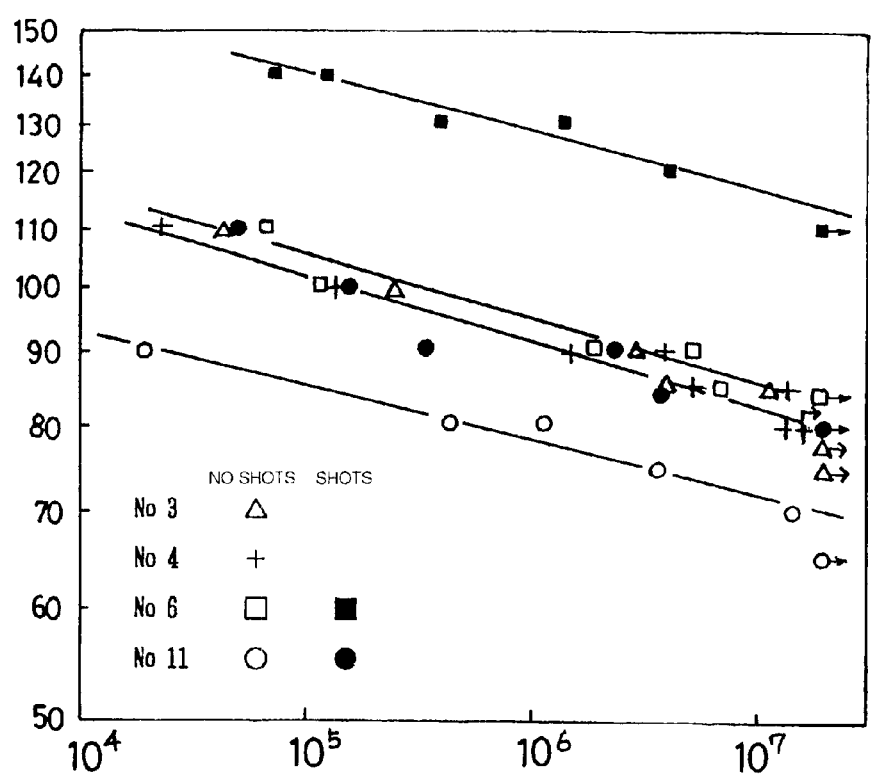
FIG. 13 shows the fatigue strength of rotary bending test specimens to which shot peening is applied subsequently to the thermal treatment of the carburization/carbonitriding treatment of the embodiment in which no cementite is precipitated in the carburization phase.

FIG. 13 shows a comparison of the rotary bending fatigue strengths of Specimens Nos. 3, 4, 6 and 11 to which the thermal treatment of FIG. 4 was applied. As noted earlier, cementite having an average grain size of about 5 μm is precipitated on the surface of Specimen No. 11 while the cementite precipitated in Specimen No. 6 has an average grain size of about 2 μm. The rotary bending fatigue strength of Specimen No. 11 is about 10% lower than those of the steels in which no cementite is precipitated. Substantially no decrease in strength is seen in Specimen No. 6 in which the grain size of cementite is restricted to about 2 μm by an addition of Al. In view of this, it is preferable to apply a thermal treatment so as, to restrict the average grain size of cementite to 3 μm or less when precipitating cementite on the surface. FIG. 13 also shows the fatigue strengths of Specimens Nos. 6 and 11 for rotary bending tests, which were subjected to thermal treatment and then to shot peening with an arc height of 0.9. Specimen No. 11 containing cementite large in grain size has not achieved a significant improvement in rotary bending fatigue strength while Specimen No. 6 containing fine cementite precipitated therein has attained a significant improvement. As seen from this result, it is important, in view of fatigue strength, to restrict the average grain size of cementite to 3 μm or less, but it is more important to eliminate cementite agglomeration. FIG. 13 further shows the rotary bending fatigue strengths of Specimens Nos. 3 and 4 to which the thermal treatment of FIG. 4 was applied. It is seen from this figure that even when the amount of cementite in Specimens No. 3 and 4 is around 25% by volume, fatigue strength can be prevented from remarkably decreasing by fining cementite particles so as to have grain sizes of 2.5 μm and 1.5 μm, respectively. Hence, surface pressure strength can be improved without causing a decrease in strength by fining cementite, on condition that the amount of cementite is up to about 30% by volume. It should, however, be noted that when allowing cementite precipitation exceeding 30% by volume, a large amount of cementite is likely to agglomerate, forming coarse cementite particles so that a significant improvement in surface pressure strength cannot be expected.

It is conceivable that the grain size of the precipitated Al nitride can be effectively reduced by setting the temperature of the carbonitriding process shown in FIGS. 3 to 5 to a low temperature. To employ a low carburizing temperature is also desirable for positively precipitating cementite by carburization as shown in FIG. 4. Practically, it is preferable to carry out the carburization/carbonitriding and carbonitriding treatments at a temperature of 800° C. or more.

According to the invention, after a fine precipitate such as Al nitrides are formed by the carburization/carbonitriding and/or carbonitriding treatment, martensite created by quenching is extremely fined, whereby fatigue failure caused by contact stress can be decreased to a significant extent. One of the features of the invention resides in that the above effect can be easily, economically achieved by use of steels containing inexpensive alloy elements such as Al which do not cause a decrease in rotary bending strength. According to the invention, in the case of a steel in which cementite precipitation is allowed, Al can be expelled from the cementite particles so that the quenching properties of the parent phase will not be impaired. In addition, Al functions to fine the precipitating cementite particles and effectively promotes the precipitation of Al nitrides, during the carbonitriding process. In consequence, the average life of the steel parts subjected to rolling fatigue can be remarkably raised.

Hence, the present invention is well suited for use in the manufacture of gears, cams, bearings, and similar high-strength and compact steel articles which are required to have wear resistance and strength for withstanding rolling or rolling-slipping fatigue.

What is claimed is:

1. A high surface pressure resistant steel part containing a fine nitride and/or carbonitride which is dispersed only in a surface structure extending from the surface to a depth of 1 mm below the surface having an average grain size of 0.3 μm or less in an amount of 1% by volume or more and containing a carbide mainly composed of cementite having an average grain size of 3 μm or less which is dispersed in an amount up to 30% by volume and having a multi phase structure composed of martensite as a parent phase which is finely divided into pieces by said dispersed substance and further containing 20 to 80% by volume residual austenite in said multi phase structure and containing 1.1 wt. % or more carbon in its surface.

2. A high surface pressure resistant steel part according to claim 1, wherein said martensite of the parent phase is more acicular than the lenticular martensite of an ordinary carburized structure, is divided into pieces by a dispersed fine nitride and/or carbonitride having a width of 0.3 μm or less, is mainly composed of fine martensite particles having a width of 1 μm or less, and is considerably disordered.

3. A high surface pressure resistant steel part according to any one of claims 1 or 2, formed as a power transmitting part which is required to have contact fatigue strength and wear resistance.

4. A high surface pressure resistant steel part according to claim 1, whose surface has a carbon content of 1.1 to 3.0 wt % and a nitrogen content of 0.4 to 2.5 wt %.

5. A high surface pressure resistant steel part according to claim 1, which contains 0.3 to 3.0 wt % Al, and containing 0.4 to 2.5 wt % nitrogen in its surface.

6. A high surface pressure resistant steel part according to claim 1 or 5, which is containing 0.5 to 5.0 wt. % Cr and 0.2 to 2.0 wt % V, and containing 1.1 to 3.0 wt % carbon in its surface.

7. A high surface pressure resistant steel part according to claim 6, containing impurities and alloy elements selected from the group consisting of Si, Mn, Mo, Ni, B, S and Pb.

8. A high surface pressure resistant steel part according to claim 7, for use as a power transmitting part which is required to have contact fatigue strength and wear resistance.

9. A high surface pressure resistant steel part according to claim 8, wherein the power transmitting part is selected from the group consisting of gears, bearings, the races of a rolling member and cam components.

* * * * *